US012665661B2

(12) United States Patent
Ye et al.

(10) Patent No.: US 12,665,661 B2
(45) Date of Patent: Jun. 23, 2026

(54) SYNCHRONIZATION OF UPLINK TRANSMISSION FROM A USER EQUIPMENT (UE) IN A NON-TERRESTRIAL WIRELESS NETWORK (NTN)

(71) Applicant: Apple Inc., Cupertino, CA (US)

(72) Inventors: Chunxuan Ye, San Diego, CA (US); Wei Zeng, Saratoga, CA (US); Haitong Sun, Cupertino, CA (US); Dan Zhang, Cupertino, CA (US); Ruoheng Liu, San Diego, CA (US); Hong He, San Jose, CA (US); Weidong Yang, San Diego, CA (US); Idan Bar-Sade, Cupertino, CA (US); Yushu Zhang, Beijing (CN); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 17/441,251

(22) PCT Filed: Aug. 30, 2021

(86) PCT No.: PCT/CN2021/115405

§ 371 (c)(1),
(2) Date: Mar. 9, 2023

(87) PCT Pub. No.: WO2023/028771

PCT Pub. Date: Mar. 9, 2023

(65) Prior Publication Data

US 2024/0031009 A1      Jan. 25, 2024

(51) Int. Cl.
*H04B 7/185* (2006.01)
*H04W 56/00* (2009.01)

(52) U.S. Cl.
CPC ...... *H04B 7/18513* (2013.01); *H04W 56/001* (2013.01); *H04W 56/0045* (2013.01); *H04W 56/009* (2013.01)

(58) Field of Classification Search
None
See application file for complete search history.

(56) References Cited

U.S. PATENT DOCUMENTS 10,862,577 B2 * 12/2020 Alasti ................ H04B 7/18513
10,871,575 B2 12/2020 Petrovic et al.
(Continued)

FOREIGN PATENT DOCUMENTS

| CN | 112154707 A | 12/2020 |
| CN | 113056875 A | 6/2021 |

(Continued)

OTHER PUBLICATIONS

Extended European Search Report directed to related European Application No. 21955351.8, mailed Feb. 27, 2025; 9 pages.
(Continued)

*Primary Examiner* — Rafael Pérez-Gutiérrez
(74) *Attorney, Agent, or Firm* — Sterne, Kessler, Goldstein & Fox P.L.L.C.

(57) ABSTRACT

Mechanisms are provided for a user equipment (UE) to determine a transmission frequency or a time advance for an uplink transmission from the UE to a base station in a non-terrestrial wireless network (NTN) without global navigation satellite systems (GNSS) information available to the UE. A communication connection between the UE and a base station can be established. The UE can determine that GNSS information is not available, and report to the base station that the GNSS information is not available. The UE can receive, from the base station, an indication of one or more parameters for an uplink transmission from the UE to synchronize the uplink transmission. The UE can determine, based on a current transmission frequency and the received indication of the one or more parameters, a next transmis- (Continued)

sion frequency and transmit the uplink transmission at the determined next transmission frequency.

18 Claims, 7 Drawing Sheets

(56)                    References Cited

U.S. PATENT DOCUMENTS

| | | | |
|---|---|---|---|
| 2017/0373907 A1* | 12/2017 | Tan | H04L 5/14 |
| 2019/0222302 A1* | 7/2019 | Lin | H04W 56/0035 |
| 2020/0313754 A1* | 10/2020 | Wang | H04W 74/0833 |
| 2021/0029658 A1 | 1/2021 | Mahalingam et al. | |
| 2021/0250885 A1* | 8/2021 | Medles | H04L 27/0014 |
| 2021/0250910 A1 | 8/2021 | Park et al. | |
| 2021/0314892 A1* | 10/2021 | Rico Alvarino | H04W 72/0446 |
| 2021/0345273 A1* | 11/2021 | Xing | G01S 19/05 |
| 2021/0352606 A1* | 11/2021 | Hosseinian | H04W 56/006 |
| 2022/0038139 A1* | 2/2022 | Eriksson Löwenmark | H04W 72/23 |
| 2022/0046566 A1* | 2/2022 | Leng | H04W 56/0045 |
| 2022/0132447 A1* | 4/2022 | Masal | H04L 5/0048 |
| 2022/0201631 A1* | 6/2022 | Wu | H04W 56/0005 |
| 2022/0210825 A1* | 6/2022 | Zhu | H04W 74/0833 |
| 2023/0224112 A1* | 7/2023 | Nishio | H04W 56/0035 370/329 |
| 2023/0308172 A1* | 9/2023 | Lin | H04B 7/18519 |
| 2023/0345375 A1* | 10/2023 | Chawla | G01S 5/019 |
| 2023/0396331 A1* | 12/2023 | Venugopal | H04W 56/005 |
| 2023/0403667 A1* | 12/2023 | Hosseinian | H04W 56/005 |
| 2023/0422195 A1* | 12/2023 | Yao | H04B 7/18513 |
| 2024/0007982 A1* | 1/2024 | Leng | H04W 56/0045 |
| 2024/0064676 A1* | 2/2024 | Medles | H04W 56/0035 |
| 2024/0064677 A1* | 2/2024 | Yan | H04W 56/0015 |
| 2024/0155536 A1* | 5/2024 | Zhang | H04B 7/18513 |
| 2024/0196362 A1* | 6/2024 | Yamine | H04W 64/003 |
| 2024/0224209 A1* | 7/2024 | Lee | H04W 76/30 |
| 2024/0267865 A1* | 8/2024 | Ma | H04W 56/0045 |
| 2025/0287332 A1* | 9/2025 | Hosseinian | H04W 72/0446 |

FOREIGN PATENT DOCUMENTS

| | | |
|---|---|---|
| EP | 3860235 A1 | 8/2021 |
| WO | WO 2014/168226 A1 | 10/2014 |
| WO | WO 2016/075040 A1 | 5/2016 |
| WO | WO 2020089471 A1 | 5/2020 |

OTHER PUBLICATIONS

International Search Report and Written Opinion of the International Searching Authority directed to related International Patent Application No. PCT/CN2021/115405, mailed Mar. 28, 2022; 8 pages.

* cited by examiner

101

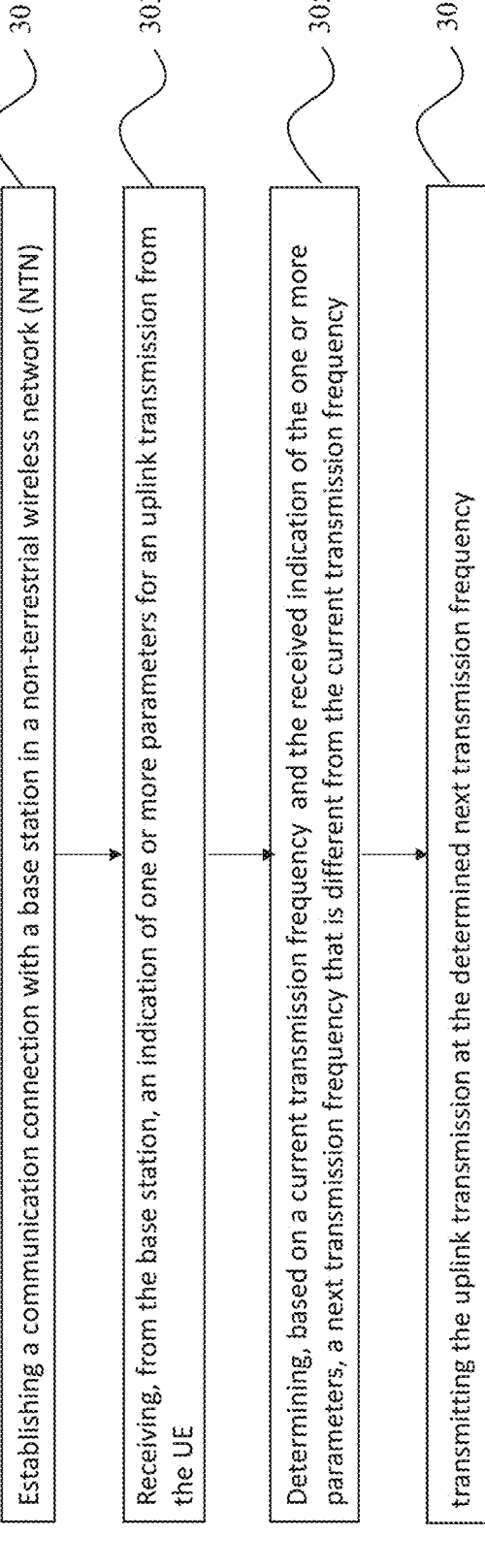

300

301

Establishing a communication connection with a base station in a non-terrestrial wireless network (NTN)

303

Receiving, from the base station, an indication of one or more parameters for an uplink transmission from the UE

305

Determining, based on a current transmission frequency and the received indication of the one or more parameters, a next transmission frequency that is different from the current transmission frequency

307 transmitting the uplink transmission at the determined next transmission frequency

UE establishes a communication connection with a base station in a non-terrestrial wireless network (NTN)

402

UE does not have GNSS and reports such information to a base station

403

UE receives the MAC CE message with frequency offset update or a time advance

405

UE applies the frequency offset indicated by the MAC CE message in its uplink transmissions

400

410

411
Stationary UE establishes a connection with a base station in a NTN

412
UE reports to the base station it is a stationary UE and its location

413
UE relies on the close loop time advance and frequency control from the base station

420

UE establishes a communication connection with a base station in a non-terrestrial wireless network (NTN)      421

UE does not have GNSS information and reports such to a base station      422

UE receives a MAC CE message with timing advance drift rate      423

UE maintains the timing advance updates as indicated the MAC CE message and applies in its uplink transmissions      425

SYNCHRONIZATION OF UPLINK TRANSMISSION FROM A USER EQUIPMENT (UE) IN A NON-TERRESTRIAL WIRELESS NETWORK (NTN)

This application is a U.S. National Phase of International Application No. PCT/CN2021/115405, filed Aug. 30, 2021, which is hereby incorporated by reference in its entirety.

FIELD

The described aspects generally relate to a non-terrestrial wireless network (NTN), including the synchronization of uplink transmissions from a user equipment (UE) in the NTN.

RELATED ART

A wireless communication system can include a fifth generation (5G) system, a New Radio (NR) system, a long term evolution (LTE) system, a combination thereof, or some other wireless systems. In addition, a wireless communication system can support a wide range of use cases such as enhanced mobile broad band (eMBB), massive machine type communications (mMTC), ultra-reliable and low-latency communications (URLLC), enhanced vehicle to anything communications (eV2X), among others. Enabling support for non-terrestrial networks has been one direction under exploration in the Third Generation Partnership Project (3GPP).

SUMMARY

Some aspects of this disclosure relate to apparatuses and methods for implementing techniques for a user equipment (UE) to determine a transmission frequency or a time advance for an uplink transmission from the UE to a base station in a non-terrestrial wireless network (NTN). In embodiments, global navigation satellite systems (GNSS) information is not available to the UE for the synchronization of uplink transmission. The UE determines the transmission frequency or the time advance for the uplink transmission based on an indication of one or more parameters received from a base station to overcome the Doppler frequency shift to the UE. The implemented techniques can be applicable to many wireless systems, e.g., a wireless communication system based on 3rd Generation Partnership Project (3GPP) release 15 (Rel-15), release 16 (Rel-16), release 17 (Rel-17), or beyond.

Some aspects of this disclosure relate to a UE. The UE can include a transceiver configured to enable wireless communication in an NTN, and a processor communicatively coupled to the transceiver. The processor can establish a communication connection with a base station in the NTN. The NTN can include a satellite, and the base station is in communication with a transceiver located on the satellite. The processor can determine that GNSS information is not available to the UE. The processor can report to the base station that the GNSS information is not available. Afterwards, the processor can receive, from the base station, an indication of one or more parameters for an uplink transmission from the UE to synchronize the uplink transmission. The processor can further determine, based on a current transmission frequency and the received indication of the one or more parameters, a next transmission frequency, and transmit the uplink transmission at the determined next transmission frequency to overcome the Doppler frequency shift.

According to some aspects, the UE can receive the indication of the one or more parameters in response to a trigger event detected by the base station, or periodically from the base station. The indication of the one or more parameters can be contained in a medium access control (MAC) control element (CE) message, a downlink control indicator (DCI) message, a configured grant configuration message, a radio resource control (RRC) configuration message, or some other control messages from the base station to the UE.

According to some aspects, the indication of the one or more parameters can include a frequency offset for the UE to adjust to the next transmission frequency from the current transmission frequency. The frequency offset can be a relative frequency offset equal to one or more of a basic offset Y. Additionally and alternatively, the frequency offset can be an absolute frequency offset equal to one or more of a basic offset Y. In some embodiments, the frequency offset can be related to a frequency drifting rate and a time difference between two uplink transmissions.

According to some aspects, the indication of the one or more parameters can be contained in a configured grant configuration message, and the indication of the one or more parameters includes a frequency offset for the UE to adjust to the next transmission frequency from the current transmission frequency for multiple uplink transmissions.

According to some aspects, the indication of the one or more parameters includes a time advance for the uplink transmission, and the time advance is based on a timing drift rate and a time difference between two uplink transmissions.

According to some aspects, the processor can report to the base station that the UE is a stationary UE, report to the base station of a GNSS location of the UE, and further stop the GNSS location tracking.

According to some aspects, a method of performing wireless communication by a UE in an NTN can include: establishing a communication connection with a base station in the NTN; receiving, from the base station, an indication of one or more parameters for an uplink transmission from the UE; determining, based on a current transmission frequency or the received indication of the one or more parameters, a next transmission frequency that is different from the current transmission frequency, and transmitting the uplink transmission at the determined next transmission frequency.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 3 illustrates an example process performed by a UE for transmitting uplink transmissions in an NTN, according to some aspects of the disclosure.

Figure 1:
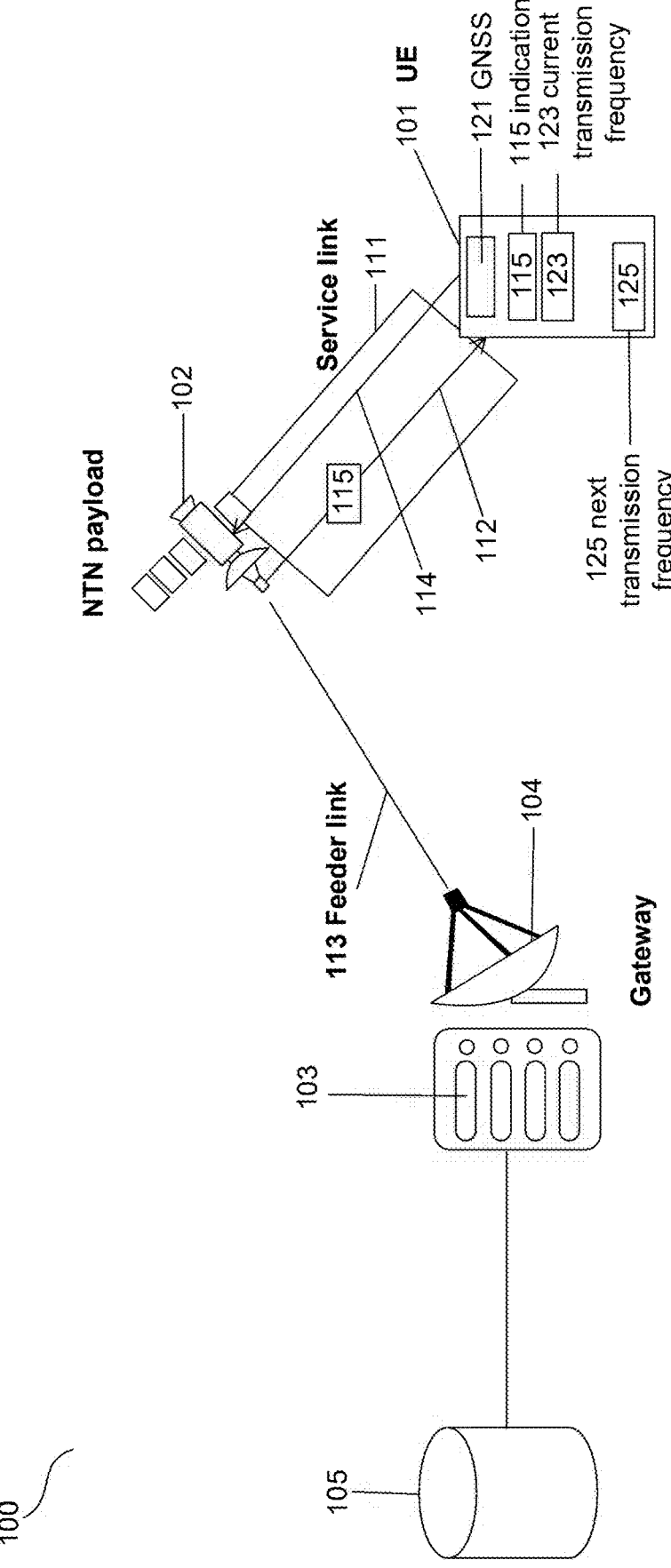
FIG. 1 illustrates a non-terrestrial wireless network (NTN) including a user equipment (UE) to transmit uplink transmissions, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Non-terrestrial wireless networks (NTN) can be referred to as non-terrestrial networks. NTN can refer to any network that involves non-terrestrial flying objects. AN NTN can include a satellite communication network, a high altitude platform systems (HAPS), an air-to-ground network, a low-altitude unmanned aerial vehicles (UAVs, aka. drones), or any other NTN network. Due to the relative movements of a user equipment (UE) or a satellite in an NTN, a UE can suffer from the Doppler frequency shift and lose synchronization with the base station.

Conventionally, for wireless communication in an NTN, actions can be taken by the UE to overcome the Doppler frequency shift based on the global navigation satellite systems (GNSS) location of the UE. A UE with GNSS capabilities can calculate, based on its position, the relative speed between the UE and the satellite, as well as the round-trip time (RTT) between the UE and the satellite. From the relative speed the UE can calculate and apply a pre-compensation for the Doppler frequency shift to ensure that its service link or uplink signal is received at the satellite or at the base station on the desired frequency.

However, there are situations when the GNSS location of a UE is not available to the UE due to various reasons such as to save power for the UE. Without GNSS information, UE cannot by itself calculate and apply the pre-compensation for the Doppler frequency shift. Accordingly, the service link Doppler frequency shift can cause the UE and the base station lose synchronization. Therefore, it becomes a challenge to support wireless communications for the UE in the NTN without GNSS information.

Some aspects of this disclosure provide mechanisms for a UE to determine a transmission frequency or a time advance for an uplink transmission from the UE to a base station in an NTN without GNSS information available to the UE for the uplink transmission. Instead of calculating the pre-compensation for the Doppler frequency shift by the UE based on GNSS information, the base station can calculate the pre-compensation for the Doppler frequency shift for the UE, and send the pre-compensation for the Doppler frequency shift to the UE as a parameter for an uplink transmission. An indication of one or more parameters for an uplink transmission can be sent by the base station to the UE. Accordingly, the UE can determine, based on a current transmission frequency or the received indication of the one or more parameters, a next transmission frequency that is different from the current transmission frequency. The UE can further transmit the uplink transmission at the determined next transmission frequency so that the Doppler frequency shift can be overcome. Mechanisms presented herein can be referred to as closed loop frequency synchronization techniques for the base station to synchronize the UE uplink transmissions.

FIG. 1 illustrates an NTN 100 including a UE 101 to transmit uplink transmissions, according to some aspects of the disclosure. Wireless system 100 is provided for the purpose of illustration only and does not limit the disclosed aspects.

NTN 100 can include, but is not limited to, UE 101, a base station 103, a satellite 102, a gateway 104, and a core network 105. UE 101 communicates with satellite 102 through a service link 111, and satellite 102 communicates with gateway 104 through a feeder link 113. Service link 111 can include a downlink 112 and an uplink 114. Satellite 102 can include a network node or a transceiver for wireless communication. There can be various implementations of NTN 100. For example, base station 103 and gateway 104 may be integrated into one unit instead of being separated components. Base station 103 and core network 105 may implement functions as a normal terrestrial wireless network without a satellite, while gateway 104 may implementation functions between a terrestrial wireless network and satellite 102.

In some embodiments, NTN 100 can have a transparent payload, where base station 103 is located on the ground. In some embodiments, NTN 100 can have a regenerative payload when base station 103 can be located on satellite 102. There can be multiple satellites with onboard base stations communicating with each other. There can be other network entities, e.g., network controller, a relay station, not shown. AN NTN can be referred to as a wireless network, a wireless communication system, or some other names known to a person having ordinary skill in the art.

In some embodiments, NTN 100 can be an NTN having a non-terrestrial flying object, e.g., satellite 102. In some embodiments, NTN 100 can include a satellite communication network that includes satellite 102, a HAPS, or an air-to-ground network, or a UAV. There can be multiple satellites in NTN 100. Satellite 102 can be a low Earth orbiting (LEO) satellite, a medium Earth orbiting (MEO) satellite, or a geosynchronous Earth orbiting (GEO) satellite. NTN 100 can be a HAPS, which can be an airborne platform including airplanes, balloons, and airships. For example, NTN R) can include the International Mobile Telecommunications base stations, known as HIBS. A HIBS system can provides mobile service in the same transmission frequencies used by terrestrial mobile networks. NTN 100 can be an air-to-ground network to provide in-flight connectivity for airplanes by utilizing ground stations which play a similar role as base stations in terrestrial mobile networks. NTN 100 can also be a mobile enabled low-altitude UAVs.

In some embodiments, satellite 102 can be a GEO satellite deployed at an altitude of 35786 Km and is characterized by a slow motion around its orbital position with respect to a point on the Earth. Compared to terrestrial cellular systems, communication networks based on a GEO satellite have a large propagation delay that has to be taken into account in the overall design of the satellite network and high propagation losses. Additionally and alternatively, satellite 102 can be a LEO satellite at an altitude of 300-3000 km. As a consequence, satellite 102 can have a lower propagation delay, lower propagation losses and a higher Doppler frequency shift than a GEO satellite.

According to some aspects, base station 103 can be a fixed station or a mobile station. In some embodiments, base station 103 can be located onboard satellite 102. Base station 103 can also be called other names, such as a base transceiver system (BTS), an access point (AP), a transmission/reception point (TRP), an evolved NodeB (eNB), a next generation node B (gNB), a 5G node B (NB), or some other equivalent terminology.

According to some aspects, UE 101 can be stationary or mobile. UE 101 can be a handheld terminal or a very small aperture terminal (VSAT) that is equipped with parabolic antennas and typically mounted on buildings or vehicles. UE 101 can be a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, service link 111 can include a downlink 112, and an uplink 114. Due to the relative movement of UE 101 and satellite 102, UE 101 can suffer from the Doppler frequency shift and lose synchronization with base station 103. The Doppler frequency shift can be observed when a source of waves is moving in relation to an observer or vice versa. This movement produces a change in frequency in relation to observer, where the source and the observer can be satellite 102 and UE 101, respectively. With satellite 102, which can be an observer, being stationary relative to the medium, if UE 101, which can be a moving source, emits waves with an actual frequency, then satellite 102 can detect waves with a frequency different from the actual frequency, with a difference caused by the Doppler frequency shift. Similar situations can be observed when satellite 102 moves. Doppler frequency shift needs to be compensated in satellite communication. Fast moving satellites can have a Doppler frequency shift of dozens of kilohertz relative to a ground station. The speed, thus magnitude of Doppler frequency shift, changes due to earth curvature. Dynamic Doppler compensation, where the frequency of a signal is changed progressively during transmission, is used so that the satellite receives a constant frequency signal.

Normally, dynamic Doppler compensation for the Doppler frequency shift is calculated based on the location, e.g., GNSS location, of UE 101. For example, UE 101 with GNSS capabilities can calculate, based on its position, GNSS location 121, and the relative speed between UE 101 and satellite 102, as well as the RTT between UE 101 and satellite 102. From the relative speed, UE 101 can calculate and apply a pre-compensation for the Doppler frequency shift to ensure that its service link 111 or uplink signal is received at satellite 102 or at base station 103 on the desired frequency.

However, there are situations when the GNSS location of UE 101 is not available to UE 101 due to various reasons. In some embodiments, to save cost, UE 101 may not have the GNSS capability. In some other embodiments, UE 101 may have the GNSS capability but may determine to stop using the GNSS capability to save power for UE 101. Without GNSS information, UE 101 cannot by itself calculate and apply the pre-compensation for the Doppler frequency shift. Accordingly, the Doppler frequency shift of service link 111 can cause the UE and the base station lose synchronization.

According to some aspects, instead of calculating the pre-compensation for the Doppler frequency shift, UE 101 can receive, via downlink 112, an indication 115 of one or more parameters for an uplink transmission from the UE 101. More specifically, UE 101 can establish a communication connection with base station 103, which may include both downlink 112 and uplink 114. UE 101 can receive, from base station 103, indication 115 of one or more parameters for an uplink transmission through uplink 114 from UE 101. Based on a current transmission frequency 123 or the received indication 115 of the one or more parameters, UE 101 can determine, a next transmission frequency 125 that is different from current transmission frequency 123 to compensate the Doppler frequency shift between UE 101 and satellite 102. Afterwards, UE 101 can transmit the uplink transmission at the determined next transmission frequency.

Figure 2:
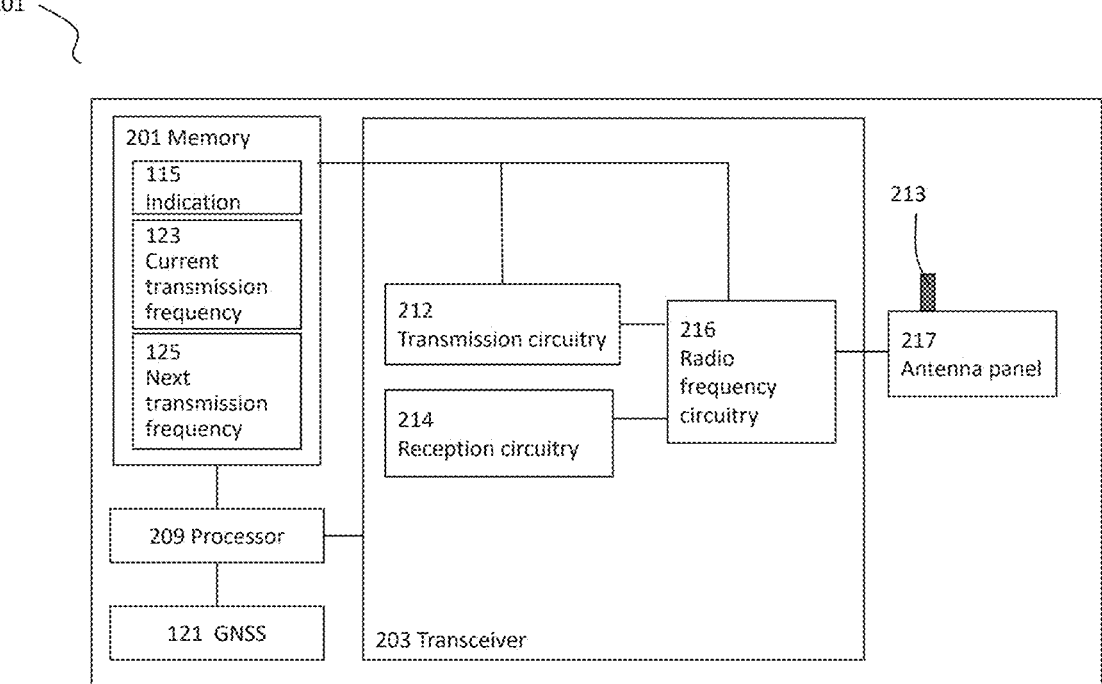
FIG. 2 illustrates a block diagram of a UE including a transceiver to transmit uplink transmissions in an NTN, according to some aspects of the disclosure.

According to some aspects, UE 101 can be implemented according to a block diagram as illustrated in FIG. 2. Referring to FIG. 2, UE 101 can have antenna panel 217 including one or more antenna elements to form various transmission beams, e.g., transmission beam 213, coupled to a transceiver 203 and controlled by a processor 209. Transceiver 203 and antenna panel 217 (using transmission beam 213) can be configured to enable wireless communication in a wireless network. In detail, transceiver 203 can include radio frequency (RF) circuitry 216, transmission circuitry 212, and reception circuitry 214. RF circuitry 216 can include multiple parallel RF chains for one or more of transmit or receive functions, each connected to one or more antenna elements of the antenna panel. In addition, processor 209 can be communicatively coupled to a memory 201, which are further coupled to the transceiver 203. Various data can be stored in memory 201. In some examples, memory 201 can store indication 115 of one or more parameters for an uplink transmission from the UE 101, current transmission frequency 123, next transmission frequency 125, or other information.

In some embodiments, memory 201 can include instructions, that when executed by the processor 209 perform operations described herein, e.g., operations to compensate the Doppler frequency shift between UE 101 and satellite 102. Alternatively, the processor 209 can be "hard-coded" to perform the operations described herein.

In some embodiments, processor 209 can be configured to establish a communication connection with base station 103. Processor 209 can determine that GNSS information 121 is not available to the UE. Processor 209 can report to base station 103, via transceiver 203, that GNSS information 121 is not available. Afterwards, processor 209 can receive, from base station 103, indication 115 of one or more parameters for an uplink transmission from UE 101. Processor 209 can further determine, based on current transmission frequency 123 or the received indication 115 of the one or more parameters, next transmission frequency 125, and transmit the uplink transmission at the determined next transmission frequency 125.

According to some aspects, UE 101 can receive indication 115 of the one or more parameters periodically from base station 103. Indication 115 having the one or more parameters can be contained in a medium access control (MAC) control element (CE) message, a downlink control indicator (DCI) message, a configured grant configuration message, a radio resource control (RRC) configuration message, or some other control message.

According to some aspects, indication 115 of the one or more parameters can include an indication of a frequency offset for UE 101 to adjust to the next transmission frequency 125 from the current transmission frequency 123. The frequency offset can be a relative frequency offset equal to one or more of a basic offset Y. In other words, the frequency difference between next transmission frequency 125 and current transmission frequency 123 is equal to a multiple of the basic offset Y. Additionally and alternatively, the frequency offset can be an absolute frequency offset equal to one or more of a basic offset Y. In other words, next transmission frequency 125 is equal to a multiple of basic offset Y, regardless of current transmission frequency 123. In some embodiments, the frequency offset can be related to a frequency drifting rate and a time difference between two uplink transmissions.

According to some aspects, indication 115 of the one or more parameters can be contained in a configured grant configuration message, and the indication of the one or more parameters includes a frequency offset for the UE to adjust to the next transmission frequency 125 from the current transmission frequency 123 for multiple uplink transmissions.

According to some aspects, indication 115 of the one or more parameters includes an indication of a time advance for the uplink transmission, and the time advance is based on a timing drift rate and a time difference between two uplink transmissions.

According to some aspects, processor 209 can report to base station 103 that UE 101 is a stationary UE, report to base station 103 of a GNSS location of UE 101, and further stop the GNSS location tracking.

FIG. 3 illustrates an example process 300 performed by a UE for transmitting uplink transmissions in an NTN, according to some aspects of the disclosure. According to some aspects, as shown in FIG. 3, process 300 can be performed by UE 101.

At 301, UE 101 can establish a communication connection with a base station in an NTN. For example, as shown in FIG. 1, UE 101 can establish a communication connection with base station 103 in NTN 100. The communication connection may include service link 111 and feeder link 113, where service link 111 can include uplink 114 and downlink 112, and the feeder link 113 provides a communication link between the satellite 102 and the gateway 104.

At 303, UE 101 can receive, from the base station, an indication of one or more parameters for an uplink transmission from the UE. For example, as shown in FIG. 1, UE 101 can receive, from base station 103, indication 115 of one or more parameters for an uplink transmission from the UE. UE 101 can save indication 115.

At 305, UE 101 can determine, based on a current transmission frequency or the received indication of the one or more parameters, a next transmission frequency that is different from the current transmission frequency. For example, as shown in FIG. 1, UE 101 can determine, based on current transmission frequency 123 or the received indication 115 of the one or more parameters, next transmission frequency 125 that is different from the current transmission frequency. The frequency difference between current transmission frequency 123 and next transmission frequency 125 is to compensate the Doppler frequency shift to UE 101. The frequency difference between current transmission frequency 123 and next transmission frequency 125 can be determined based on the received indication 115 of the one or more parameters from base station 103, instead of being calculated by UE 101 based on GNSS information.

At 307, UE 101 can transmit the uplink transmission at the determined next transmission frequency. For example, as shown in FIG. 1, UE 101 can transmit the uplink transmission at the determined next transmission frequency 125.

Figure 4A:
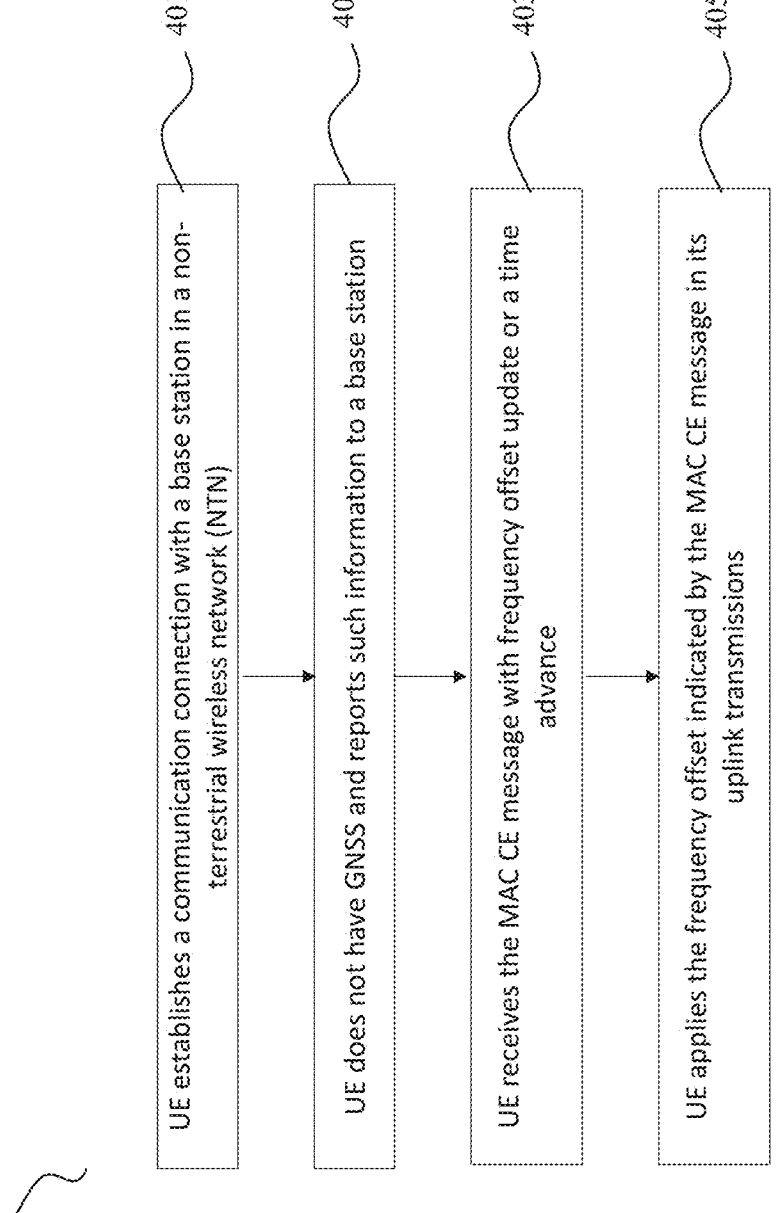
FIGS. 4A-4C illustrate example processes performed by a UE for transmitting uplink transmissions in an NTN, according to some aspects of the disclosure.
Figure 4B:
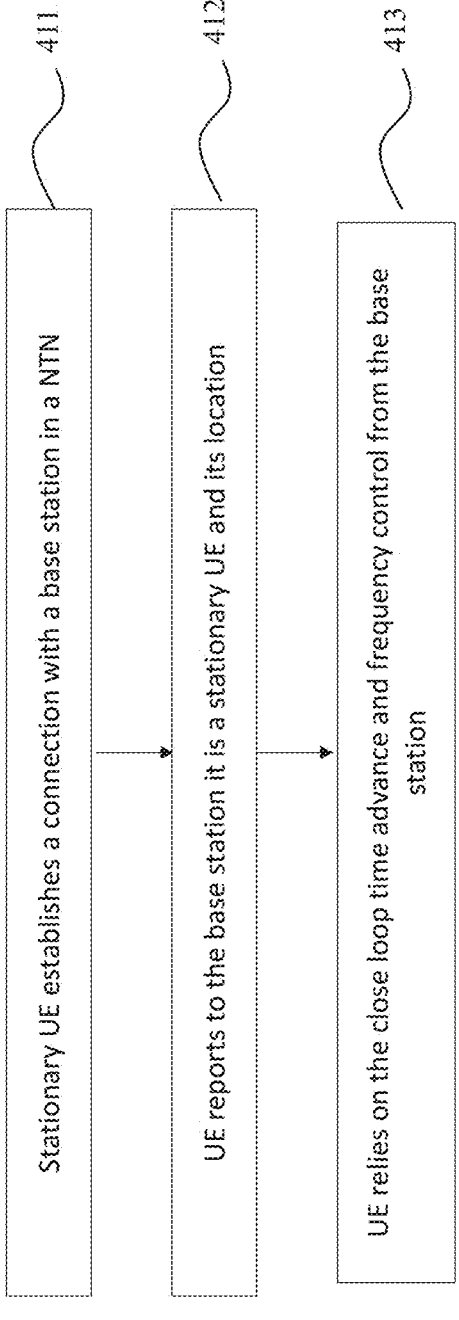
Figure 4C:
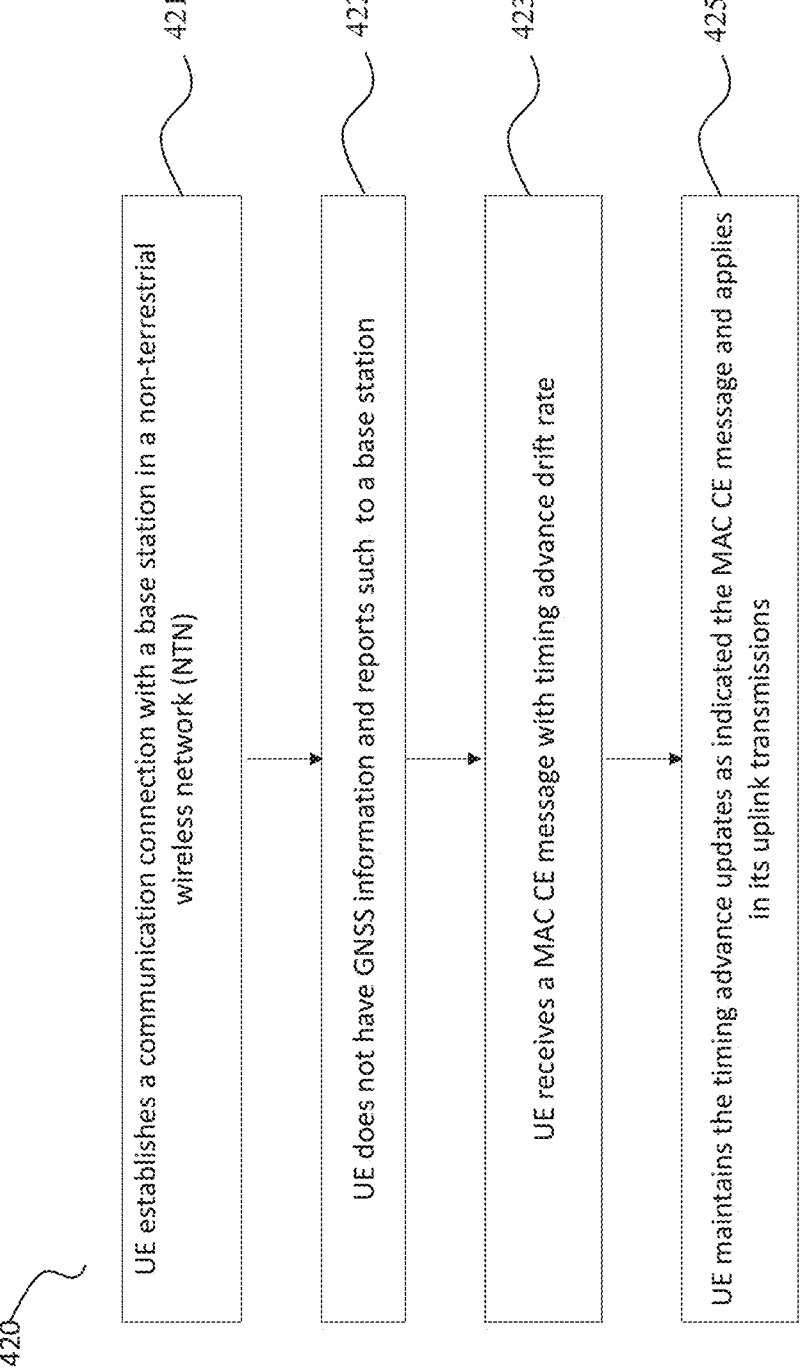

FIGS. 4A-4C illustrate example processes, e.g., process 400, process 410, and process 420, performed by a UE for transmitting uplink transmissions in an NTN, according to some aspects of the disclosure. Process 400, process 410, and process 420 can be examples of process 300, illustrated with more, less, or different details.

Process 400 is shown in FIG. 4A, where an indication of one or more parameters for an uplink transmission is carried by a medium access control (MAC) control element (CE) message.

At 401, UE 101 can establish a communication connection with base station 103. The communication connection may include service link 111 and feeder link 113, where service link 111 can include uplink 114 and downlink 112. Operations performed at 401 can be examples of operations performed at 301.

At 402, UE 101 can determine that GNSS information is not available to UE 101, and report to base station 103 that the GNSS information is not available. UE 101 may switch from open loop frequency adjustment based on downlink reception frequency to closed loop frequency adjustment based on explicit control from base station 103. Accordingly, UE 101 can decouple the downlink reception frequency at downlink 112 from the uplink transmission frequency at uplink 114.

At 403, based on the reporting to base station 103, UE 101 can receive indication 115 of the one or more parameters, where the indication 115 can be carried by a MAC CE message, and can include a time advance or a frequency offset update for both time synchronization and frequency synchronization purpose. Operations performed at 403 can be examples of operations performed at 303. In some embodiments, indication 115 can include both a frequency offset update and a time advance. In general, UE 101 without GNSS can lose both frequency synchronization and time synchronization. Accordingly, when indication 115 includes both a frequency offset update and a time advance can help to correct both time and frequency errors at UE 101 due to Doppler frequency shift and lose of time synchronization. Indication 115 can be sent periodically with a fixed period, or can be event-triggered. For example, base station 103 can send indication 115 when base station 103 detects the reception from UE 101 is below a performance threshold.

At 405, UE 101 can apply the frequency offset update indicated by the MAC CE message, and determine, based on current transmission frequency 123 or the received indication 115, next transmission frequency 125 that is different from the current transmission frequency 123. In some embodiments, UE 101 can apply the frequency offset indicated in the MAC CE message after X ms, e.g., 3 ms, after it receives the MAC CE message. Operations performed at 405 can be examples of operations performed at 305.

In some embodiments, the frequency offset update contained in indication 115 and carried by the MAC CE message can be a relative frequency offset, with a frequency correction range of $+/-X$ Hz. In some embodiments, a string of A bits can be used to indicate the relative frequency offset. $F_A$ can be derived from the A bit-sequence as a natural representation. For example, an indication "00101" can indicate $F_A=5$, which is an indication of the adjustment to the transmission frequency. In some embodiments, A may be less than 8 bits to fit in a byte with a frequency offset group identifier. In some embodiments, a frequency offset can be equal to one or more of a basic offset Y Hz. In detail, next frequency 125, denoted as $F_{new}$, can be calculated as $F_{new}=F_{old}+(F_A-Z)*Y$, where $F_{old}$ is the current frequency 123, $Z=2^{A-1}-1$ or $Z=2^{A-1}$. Additionally and alternatively, one can calculate $F_{new}$ as $F_{new}=F_{old}+(F_A-Z)*Y*2^\mu$, where $Z=2^{A-1}-1$ or $Z=2^{A-1}$. The basic offset Y may depend on the sub-carrier spacing. For a larger sub-carrier spacing, the value of Y can be larger, while the value of Y can be smaller for a smaller sub-carrier spacing. For example, Y can be a certain percentage of the sub-carrier spacing. In addition, Y may depend on the satellite deployment scenario. When satellite 102 is a GEO, Y may have a smaller value, while Y may have a larger value when satellite 102 is a LEO.

In some embodiments, the frequency offset update contained in indication 115 and carried by the MAC CE message can be an absolute frequency offset. Suppose a string of a total of A bits are used for the absolute frequency offset, $F_A$ can be derived from the A bit-sequence as a natural representation. The next transmission frequency $F_{new}$ can be calculated as $F_{new}=F_A*Y$. Additionally and alternatively, the next transmission frequency $F_{new}$ can be calculated as $F_{new}=F_A*Y*2^\mu$. The basic offset Y may depend on the sub-carrier spacing. For a larger sub-carrier spacing, the value of Y can be larger, while the value of Y can be smaller for a smaller sub-carrier spacing. For example, Y can be a certain percentage of the sub-carrier spacing. In addition, Y may depend on the satellite deployment scenario. When satellite 102 is a GEO, Y may have a smaller value, while Y may have a larger value when satellite 102 is a LEO.

In some embodiments, instead of using a MAC CE message, a downlink control indicator (DCI) message can be used to carry indication 115 of one or more parameters for an uplink transmission from UE 101. DCI message to carry indication 115 can be suitable for UEs without GNSS capability. When UE does not always receive GNSS signals, it may report to base station 103 so that the corresponding time and frequency correction indication could be sent from base station 103. The UE may switch from open loop frequency adjustment based on downlink reception frequency to closed loop frequency adjustment based on an explicit control from base station 103. UE 101 can decouple the uplink transmission frequency from the downlink reception frequency. When UE 101 receives the DCI message with a frequency offset update, UE 101 applies the frequency offset update on top of the uplink frequency used in the last uplink transmissions, which is current transmission frequency 123. Certain timeline restrictions may be applied for frequency offset update.

The DCI message can be non-fallback DCIs, such as DCI format 0_1 or 0_2. Uplink grant DCI with frequency offset information can be used to adjust the frequency of PUSCH transmission. Downlink grant DCI with frequency offset information can be used to adjust the frequency of PUCCH transmission. In some embodiments, the DCI message can have a configurable field to include the frequency offset indication. The DCI message including the frequency offset indication can be different from the legacy DCI formats. For example, the DCI message including the frequency offset indication can be based on scrambling of the DCI cyclic redundancy check (CRC), where a new Radio Network Temporary Identifier (RNTI) can be used to scramble the CRC of the DCI with frequency offset indication.

In some embodiments, a configurable table can be used to indicate the frequency offset update values. The DCI message can have a field to indicate the table entry. The relative frequency offset may be indicated such as $(-\Delta,0, \Delta, 2\Delta)$. $F_{new}=F_{old}+Y$, where Y is indicated by the DCI message and $F_{old}$ is current transmission frequency 123 used in the earlier uplink transmissions.

In some embodiments, other control message can be used instead of the MAC CE message or the DCI message. For example, the uplink configured grant message after the dynamic uplink grant by the DCI can be used to include indication 115. In some embodiments, a configured grant configuration message can include an indication 115 of the frequency offset. The configured grant configuration message can be either type 1 or type 2 configured grant. When the configured grant configuration message is used to carry the frequency offset gap, the frequency offset gap can be applicable to each period of the configured grant "Frequency offset step" field. The frequency offset gap $\Delta$ can be applied to each uplink transmission in the configured grant. For example, the first uplink transmission is based on transmission frequency f; then the second uplink transmission can be based on $f+\Delta$; the third uplink transmission is based on $f+2\Delta$, etc. For type 2 configured grant, the "frequency offset step" may be indicated in the activating DCI, which includes this field.

Process 410 is shown in FIG. 4B, where an indication of one or more parameters for an uplink transmission is sent to a UE that is stationary. A stationary UE may report its GNSS location to a base station and rely on the base station to control the time and frequency synchronization in the RRC connected mode.

At 411, UE 101 can establish a communication connection with base station 103, where UE 101 is stationary. Operations performed at 401 can be examples of operations performed at 301.

At 412, UE 101 can determine that GNSS information, such as GNSS location, and report to base station 103. A stationary UE may report its GNSS location at the initial stage (initial access). The GNSS location may be configured when the device was initially installed or activated. UE 101 can report to base station 103 it is a stationary UE so that base station 103 can fully control the uplink time and frequency synchronization for UE 101.

At 413, based on the reporting to base station 103. UE 101 may switch from open loop frequency adjustment based on downlink reception frequency to a closed loop frequency adjustment based on explicit control from base station 103. A stationary UE does not need to tract its GNSS location, and does not need to read serving satellite ephemeris information. Hence, UE 101 can stop the GNSS location tracking, which can save power by avoid reading system information with serving satellite ephemeris. Accordingly, UE 101 can decouple the uplink transmission frequency at uplink 114 from downlink reception frequency at downlink 112.

In some embodiments, UE 101 can receive indication 115 of the one or more parameters, and apply indication 115, such as a frequency offset update indicated by a MAC CE message, and determine, based on current transmission frequency 123 or the received indication 115, next transmission frequency 125 that is different from the current transmission frequency 123.

In some embodiments, the frequency offset can be related to a frequency drifting rate ($D_f$) and a time difference between two uplink transmissions. Frequency drift rate $D_f$ may be indicated by base station 103 to UE 101 to capture the Doppler frequency shift on the service link 111, due to satellite movement. Frequency offset may also be indicated by base station 103, which can be contained in a MAC CE message, a RRC configuration of a DCI message. The next transmission frequency can be determined based on $F_{new}=F_{old}+D_f\Delta_t$, where $\Delta_t$ can be a time difference between two uplink transmissions. $\Delta_t$ can be tracked by a timer, and the validity of the timer for the frequency drift rate may be configured or signaled by base station 103.

Process 420 is shown in FIG. 4C, where an indication of one or more parameters for an uplink transmission from the UE can include a timing advance. The indication can be carried by a MAC CE message, or other control messages.

At 421, UE 101 can establish a communication connection with base station 103. The communication connection may include service link 111 and feeder link 113, where service link 111 can include uplink 114 and downlink 112. Operations performed at 421 can be examples of operations performed at 301.

At 422, UE 101 can determine that GNSS information is not available to UE 101, and report to base station 103 that the GNSS information is not available. UE 101 may switch from open loop time adjustment to closed loop time adjustment based on explicit control from base station 103.

At 423, based on the reporting to base station 103. UE 101 can receive indication 115 of the one or more parameters, where indication 115 can be carried by a MAC CE message, and can include a time advance or a frequency offset update for frequency synchronization purpose. In some embodiments, indication 115 can include both a frequency offset update and a time advance, such as a timing advance drift rate indication.

At 425, UE 101 can apply the time advance and/or the frequency offset update indicated by the MAC CE message, and determine, based on current transmission frequency 123 or the received indication 115, next transmission frequency 125. Operations performed at 425 can be examples of operations performed at 305.

In some embodiments, the timing advance drift rate indication can be carried by a MAC CE message. When UE 101 is in a connected mode and does not receive GNSS information for some time, UE 101 can report to base station 103 that GNSS information is not available. Base station 103 can trigger the timing advance drift rate carried by the MAC CE message. In some embodiments, the MAC CE message can carry only TA drift rate ($D_{TA}$). In some other embodiments, the MAC CE message can carry both TA ($N_{TA}$) and TA drift rate ($D_{TA}$). Furthermore, high order derivatives of TA drift rate may also be included. Base station 103 may further configure and signal the validity timer for $\Delta t$. UE 101 can maintains TA based on the equation:

$$T_{TA}=(N_{TA}+N_{TA,UE\text{-}specific}+N_{TA,common}+N_{TA,offset})\times T_C$$

where $N_{TA,new}=N_{TA,old}+D_{TA}*\Delta t$.

Figure 5:
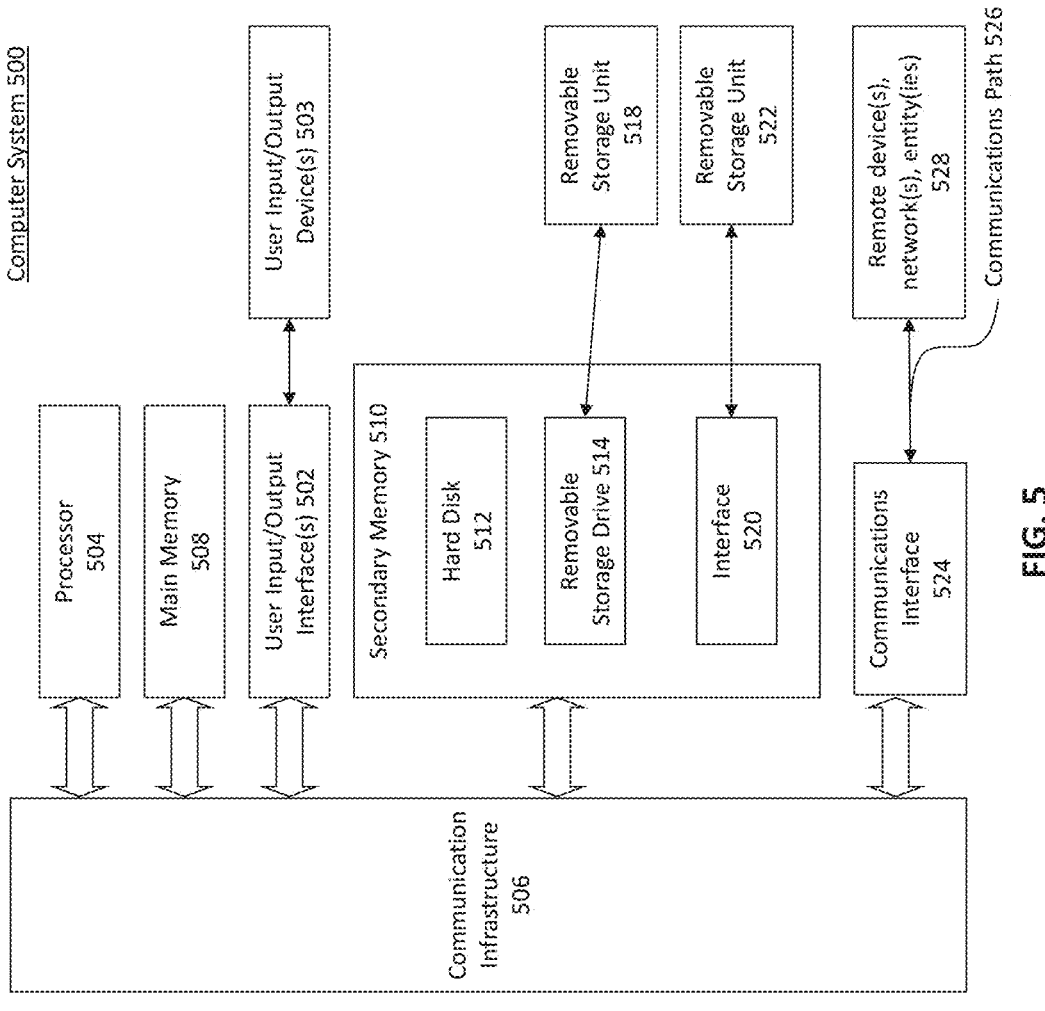
FIG. 5 is an example computer system for implementing some aspects or portion(s) thereof of the disclosure provided herein.

Various aspects can be implemented, for example, using one or more computer systems, such as computer system 500 shown in FIG. 5. Computer system 500 can be any computer capable of performing the functions described herein such as UE 101, or base station 103 as shown in FIG. 1 and FIG. 2, for operations described for processor 209 or process 300, process 400, process 410, or process 420 as shown in FIGS. 3, 4A-4C. Computer system 500 includes one or more processors (also called central processing units, or CPUs), such as a processor 504. Processor 504 is connected to a communication infrastructure 506 (e.g., a bus). Computer system 500 also includes user input/output device (s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 508, the removable storage unit 518, the removable storage unit 522 can store instructions that, when executed by processor 504, cause processor 504 to perform operations for a UE or a base station, e.g., UE 101, or base station 103 as shown in FIG. 1 and FIG. 2. In some examples, the operations include those operations illustrated and described for process 300, process 400, process 410, or process 420 as shown in FIGS. 3, 4A-4C.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526. Operations of the communication interface 524 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A method of performing wireless communication by a user equipment (UE), comprising:

establishing a communication connection with a base station in a non-terrestrial wireless network (NTN);

determining whether global navigation satellite systems (GNSS) information is not available to the UE;

in response to a determination that the GNSS information is not available, reporting to the base station that the GNSS information is not available;

receiving, from the base station, based on the reporting to the base station, an indication of one or more parameters for an uplink transmission from the UE to the base station, wherein the indication includes a timing drift rate of the UE for determination of a time advance for the uplink transmission, wherein the time advance is based on at least a product of the timing drift rate of the UE received from the base station and a time difference between two uplink transmissions from the UE to the base station;

determining, based on a current transmission frequency and the received indication of the one or more parameters, a next transmission frequency that is different from the current transmission frequency; and transmitting the uplink transmission at the determined next transmission frequency and based on the time advance.

2. The method of claim 1, further comprising:

reporting to the base station that the UE is a stationary UE;

reporting to the base station of a global navigation satellite systems (GNSS) location of the UE at an initial access stage that is configured when the stationary UE is initially installed; and stopping the GNSS location tracking.

3. The method of claim 1, wherein the UE receives the indication of the one or more parameters periodically from the base station.

4. The method of claim 1, wherein the indication of the one or more parameters is contained in a medium access control (MAC) control element (CE) message, a downlink control indicator (DCI) message, a configured grant configuration message, or a radio resource control (RRC) configuration message.

5. The method of claim 1, wherein the indication of the one or more parameters includes a frequency offset for the UE to adjust to the next transmission frequency from the current transmission frequency.

6. The method of claim 5, wherein the frequency offset between the current transmission frequency and the next transmission frequency is a relative frequency offset equal to one or more of a basic offset Y.

7. The method of claim 5, wherein the frequency offset is an absolute frequency offset equal to one or more of a basic offset Y.

8. The method of claim 5, wherein the frequency offset is related to a frequency drifting rate and a time difference between two uplink transmissions.

9. The method of claim 1, wherein the indication of the one or more parameters is contained in a configured grant configuration message, and the indication of the one or more parameters includes a frequency offset for the UE to adjust to the next transmission frequency from the current transmission frequency for multiple uplink transmissions.

10. The method of claim 1, wherein the non-terrestrial wireless network includes a satellite, and the base station is in communication with a transceiver located on the satellite.

11. A user equipment (UE), comprising:

a transceiver configured to enable wireless communication in a non-terrestrial wireless network (NTN); and a processor communicatively coupled to the transceiver and configured to:

establish a communication connection with a base station in the NTN;

determine whether global navigation satellite systems (GNSS) information is not available to the UE;

in response to a determination that the GNSS information is not available, report to the base station that the GNSS information is not available;

receive, from the base station, an indication of one or more parameters for an uplink transmission from the UE to the base station, wherein the indication includes a timing drift rate of the UE for determination of a time advance for the uplink transmission, wherein the time advance is based on at least a product of the timing drift rate of the UE received from the base station and a time difference between two uplink transmissions from the UE to the base station;

determine, based on a current transmission frequency and the received indication of the one or more parameters, a next transmission frequency; and transmit the uplink transmission at the determined next transmission frequency and based on the time advance.

12. The UE of claim 11, wherein the processor is further configured to:

report to the base station that the UE is a stationary UE;

report to the base station of a global navigation satellite systems (GNSS) location of the UE at an initial access stage that is configured when the stationary UE is initially installed; and stop the GNSS location tracking.

13. The UE of claim 11, wherein the UE receives the indication of the one or more parameters periodically from the base station.

14. The UE of claim 11, wherein the indication of the one or more parameters is contained in a medium access control (MAC) control element (CE) message, a downlink control indicator (DCI) message, a configured grant configuration message, or a radio resource control (RRC) configuration message.

15. The UE of claim 11, wherein the indication of the one or more parameters includes a frequency offset for the UE to adjust to the next transmission frequency from the current transmission frequency.

16. The UE of claim 15, wherein the frequency offset between the current transmission frequency and the next transmission frequency is a relative frequency offset equal to one or more of a basic offset Y.

17. A non-transitory computer-readable medium storing instructions that, when executed by a processor of a user equipment (UE), cause the UE to perform operations, the operations comprising:

establishing a communication connection with a base station in a non-terrestrial wireless network (NTN);

determining whether global navigation satellite systems (GNSS) information is not available to the UE;

in response to a determination that the GNSS information is not available, reporting to the base station that the GNSS information is not available;

receiving, from the base station, based on the reporting to the base station, an indication of one or more parameters for an uplink transmission from the UE to the base station, wherein the indication includes a timing drift rate of the UE for determination of a time advance for the uplink transmission, wherein the time advance is based on at least a product of the timing drift rate of the UE received from the base station and a time difference between two uplink transmissions from the UE to the base station;

determining, based on a current transmission frequency and the received indication of the one or more parameters, a next transmission frequency; and transmitting the uplink transmission at the determined next transmission frequency and based on the time advance.

18. The non-transitory computer-readable medium of claim 17, wherein the indication of the one or more parameters is contained in a medium access control (MAC) control element (CE) message, a downlink control indicator (DCI)

message, a configured grant configuration message, or a radio resource control (RRC) configuration message.

* * * * *